UNITED STATES PATENT OFFICE.

JOHN D. CARTER, OF LANSDOWNE, PENNSYLVANIA.

WATERPROOF CEMENTITIOUS COMPOSITION.

No Drawing.  Application filed May 9, 1923. Serial No. 637,883.

My new composition of matter may also be used as a paint or as a plastic to form molded articles of various kinds, as a cement to set tile, earthenware and refractory materials, and as a cementitious binder for filler materials in the making and surfacing of roadways. This application is a continuation, in part, of my co-pending application, Serial Number 485,648, filed July 18, 1921.

Heretofore, cements which were cheaply available have been deficient in two important characteristics; first, they lacked in adhesive quality, and second, the time required for setting to take place was a fixed time which might or might not be convenient in the particular process at hand. Sodium silicate and sodium silicate cements have had the desired property of adhesiveness, but they have depended for their setting upon the loss of moisture, usually by evaporation. It was possible to control the setting time by varying the concentration of the sodium silicate solution used and by varying the proportions of inert matter which was mixed with the silicate, but such sodium silicate cements as could be caused to set without a baking process were always deficient in respect to their resistance to water. The sodium silicate solution, being a water solution, might be redissolved under suitable conditions and when so dissolved, the cement will disintegrate to a greater or less degree and lose its adhesive value. For instance, in the manufacture of multi-ply products, such as the plywood, which is used for shipping containers, furniture construction, trunk making and the like, or any wall board or container board made from plies of wood pulp or sheets of paper and which are, in the present state of the art, stuck together with suitable solutions of sodium silicate or of sodium silicate solutions mixed with inert earthy materials, it is possible to make products which have satisfactory adhesion, rigidity and properties necessary to the carrying out of processes of their manufacture, but all are subject to the destructive influence of water. Likewise, in the field of cements, it is possible to produce, in the present state of the art, products which have most of the desirable characteristics adapted for such purposes as making water-tight joints, acid proof joints in conductor pipes, molded articles of a great variety and for diverse uses, with sodium silicate, except for their failure to retain these desirable characteristics on exposure to water.

One of the objects of my invention is to produce a cement which, while retaining the desirable adhesive characteristics which are known in the art as obtainable with sodium silicate, will yet be insoluble in water and hence capable of resisting an exposure to water, a result heretofore unattainable with the known materials.

My object is further to produce a composition which is easily and cheaply prepared and one which depends for its set on an internal chemical process rather than upon the loss of moisture.

My object is further to produce combined boards of various types above mentioned, which shall be capable of withstanding hot, damp, climatic conditions and even direct exposure to water, and which, at the same time, shall be easily prepared and adaptable to the ordinary manufacturing processes, and resistant to the attacks of vermin, and to have in general the desirable characteristics of the combined boards now commercially produced, with the addition of the ability to resist water.

A further object is to produce a combined board which when moistened will not yield alkali in such a way as to injuriously affect the rosin size, with which combined boards and paper products are rendered more resistant to moisture. Ordinary sodium silicate, when it dissolves, is likely to penetrate the board and destroy the waterproofing effect of the rosin size.

Further objects of my invention will appear in the specification and claims below.

Sodium silicate is a substance, the constituents of which may be varied within rather wide limits, and with this variation of constituents there is a wide variation in physical properties. Practically, the ratio of sodium oxid, $Na_2O$, to silica, $SiO_2$, may vary between 1 to 1, which would be represented by the formula $Na_2SiO_3$, and 1 to 4, which might be represented by the formula $Na_2Si_4O_9$. Products of all intermediate compositions may be produced at will. Ratios of the character of 1 to 4 and up to 1 to 3.25 are commercially known as "neutral silicates" and silicates with a ratio of 1 to 2, or a greater ratio of the sodium oxid to the silica are known as "alkaline silicates". I have discovered that silicate solutions of these different types behave very differently when mixed with certain mineral substances, suitably pulverized, to make cements and adhesives. For instance, calcium carbonate or calcium phosphate may be mixed with a so-called neutral silicate solution and the mixture will remain liquid for a matter of several days, but if these same substances be mixed with solutions of the alkaline silicates of the same concentration a chemical reaction occurs which causes the mass to set into a hard condition and the rate at which this setting takes place appears to be dependent upon the relative alkalinity of the silicate solution employed, that is, upon its ratio of sodium oxid to silica. By reason of the fact that the reaction of an alkaline sodium silicate solution and calcium carbonate or calcium phosphate are so similar under like conditions, to produce substantially water insoluble cement, they may well be regarded as chemical equivalents in the practice of my invention.

Conversely, I have found that there are some substances which react readily with the neutral silicate solutions, and more and more slowly as silicate solutions of an increasing alkalinity are used. Substances of this character are ordinary Portland cement and hydrated lime which may also be properly regarded as chemical equivalents in the practice of my invention. In all cases where the setting action takes place, due to chemical causes, that is, where the viscosity of the mixture is greatly increased without the loss of moisture, until the product becomes solid, that product is substantially insoluble in water. I believe that this is due, at least in part, to the formation of double silicates of sodium and the various metals which form insoluble silicates. Thus, we may have a double silicate of sodium and substantially any metal, except potassium, lithium and the rare metals of the alkali group. It may also be that the water resistance is in part due to the formation of an insoluble gel of silicic acid, although it appears that this alone cannot account for the properties secured.

When one mixes substantially 60 parts by weight of whiting (calcium carbonate) with substantially 50 parts by weight of a solution of sodium silicate, in which the ratio of the sodium oxid, $Na_2O$, to silica, $SiO_2$, is as 1 to 2 and in which the concentration is substantially from 30° to 40° Baumé and uses this as the adhesive for combining a multiply paper board, and this board is allowed to stand for two or three days, or in some instances for a longer time, a product is obtained which may be immersed in water for many hours and removed without the bond between the various plies being loosened. While the setting of the adhesive takes place rapidly in such a process, I have found that a chemical reaction proceeds through a period of several days, during which time the board becomes progressively more water resistant.

To make such an adhesive I may take, for instance, 60° Baumé sodium silicate solution, the ratio of the components of which is substantially one part of the sodium oxid to two parts of the silica, and dilute it with water down to from 30° Baumé to 40° Baumé. I then add to the sodium silicate solution, so diluted, a sufficient amount of calcium carbonate (whiting or similar material) to react with the sodium silicate to produce, upon setting, a substantially insoluble compound.

I have found that the proportions of the materials so added to the diluted sodium silicate solution may vary between relatively wide limits. For example, I may take 50 parts by weight of a 60° Baumé sodium silicate solution (having the said ratio of 1 to 2 above explained) diluted with water down to 31.5° Baumé, and add thereto 50 to 60 parts by weight of whiting, and so produce my waterproof cement, i. e., a cement which becomes waterproof after standing for about two or three days, although standing for a longer time will generally increase the water-resisting property of the resulting cement. But for some purposes I may add to the said diluted sodium silicate solution a considerably smaller amount (e. g., down to substantially 12½ parts by weight) of the whiting or other suitable material and form the said insoluble cement. The time of the setting, however, will vary considerably, depending upon the relative proportion of the added material to the sodium silicate solution.

To make such a board, a plurality of sheets or plies of suitable stock, such as paper stock, are unreeled from large rolls thereof and are brought to a position in which the sheets or plies are relatively near each other. These sheets or plies may be of the same material although they may be and generally are of different materials. Thus the intermediate sheet may be of corrugated paper and the outer sheets may be of relatively thin material to be adhesively secured thereto at the tops of the corrugations. To the manufacture of such board my new adhesive is particularly adapted and useful because such board is frequently used in making shipping boxes or containers which are frequently subjected to moist or wet conditions wherein a waterproof adhesive would be of great advantage.

In making such combined boards, one or more of the adjacent surfaces of the plies is, or are given, a coating of the new adhesive above referred to and the plies are then brought together under pressure, a thin layer of the adhesive serving to unite the plies firmly together. The plies thus united are then allowed to stand for a considerable period of time, as also above indicated, whereupon as the chemical reaction between the ingredients of the adhesive progresses, the composition thereof will change to a water-resisting composition; that is to say, a composition which is not substantially affected by the presence of water. The resultant layer of adhesive will be a compound insoluble in water.

The board so formed will consist substantially of a plurality of plies of papers, cardboard or similar material united by a water-resisting adhesive, and is therefore particularly adapted for making containers in which goods may be shipped to, or stored in, places where they are subjected to hot, moist, climatic conditions.

I have further found that the setting time, or the time within which the reaction takes place, may be controlled and varied by a suitable selection of reacting substances on the one hand, or by the selection of silicate solutions of varying ratios on the other hand. Thus when I employ a mixture of sodium silicate and calcium carbonate or calcium phosphate, the time required for the resulting composition to become substantially insoluble in water decreases as the alkalinity of the silicate solution is increased, but, when calcium hydroxid (hydrated lime) or Portland cement is mixed with a sodium silicate solution, the time required for the resulting material to become substantially water-insoluble is lengthened as the alkalinity of the silicate employed is increased or I may mix with the sodium silicate and the material added thereto to react therewith to produce a substantially water-insoluble cement, other materials, such as the oxids, phosphates, carbonates or other salts of any of the metals to modify the rate of time within which the cement sets and the insoluble property or characteristics of the resulting cement appear to be fully developed.

While I have particularly described one embodiment of my invention in the production of a laminated fiber board, it is obvious that a great variety of adaptation of the new product can be secured. For instance, by using a larger amount of the calcium carbonate or Portland cement or other mineral constituent with the sodium silicate, a mass is secured which may be pressed into molds or which may be suitably diluted when necessary, and be spread upon a surface to form a surface coating, such as a paint, coating or flooring material, all of which will be characterized by the formation of an insoluble product resulting from the action between sodium silicate and the material or materials added thereto as above described. The reaction to produce the said composition may readily be secured by selecting a solution of sodium silicate the alkalinity of which is such as to make it react in any desired or predetermined time with the mineral compound or mixture of mineral compounds which may have been selected.

On account of its property of insolubility, its hardness and its low cost, my composition is further adapted for other uses or purposes. Thus, it may be used as a cementitious binder for the broken stone, gravel, sand or similar materials in the making of roadways and in the surfacing of roadways. My composition so used imparts to the road a hard surface and makes the road resistant to the action of water thereon, whether said water be applied by sprinkling or flushing to allay the dust and to clean the road, or by the processes of nature. Water, even when lightly applied to the ordinary roads has the effect of softening the road, and increasing the wearing effect of the traffic thereon. When my invention is thus used in road making, the filler materials of the road composition or of the surface of the road are firmly united and cemented together by a cement or binder which is hard, durable and substantially water resisting.

Having thus described my invention, I claim and desire to protect by Letters Patent of the United States:

1. A waterproof cementitious composition of matter produced by mixing calcium carbonate with substantially an equal amount by weight of a sodium silicate solution of from 30° to 40° Bé. and in which the ratio of the sodium oxid to the silica is substantially as 1:2.

2. A cementitious composition comprising substantially equal parts by weight of calcium carbonate and a sodium silicate solution in which the ratio of the sodium oxid to the silica is substantially 1 to 2, and containing water sufficient to dilute the sodium silicate to substantially 31.5° Bé.

3. A cementitious composition comprising 50 parts by weight of a 31.5° Bé. solution of sodium silicate in which the ratio of the sodium oxid to the silica is substantially as 1 to 2 and from 12½ to 60 parts by weight of calcium carbonate.

In witness whereof, I have hereunto set my hand this 8th day of May, 1923.

JOHN D. CARTER.